UNITED STATES PATENT OFFICE 2,601,282

ALPHA-ALKYL-BETA-ARYLNITROETHENES

Richard V. Heinzelmann, Kalamazoo, Mich., assignor to The Upjohn Company, Kalamazoo, Mich., a corporation of Michigan No Drawing. Application April 30, 1948, Serial No. 24,430

5 Claims. (Cl. 260—612)

The present invention relates to an improved process for the production of alpha-alkyl-beta-arylnitroethenes by condensation of aromatic aldehydes with primary polycarbon nitro paraffins and to products produced by such process.

The compounds concerned herein have the formula:

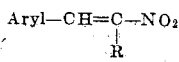

wherein aryl is a phenyl or naphthyl radical, including substituted phenyl and naphthyl radicals, and R is alkyl. The compounds are useful intermediates in the preparation of therapeutically-active amines.

Condensation of nitromethane with an aromatic aldehyde is a very rapid, exothermic reaction, the aldehyde being converted almost quantitatively to a nitroethene [Org. Syn. Col. vol. I, 2nd ed., John Wiley and Sons, New York (1941), page 413]. In contrast to this rapid reaction and high conversion of starting material with nitromethane, the condensation of an aromatic aldehyde with a nitro paraffin having at least two carbon atoms, such as nitroethane, nitropropane, and the like, is characterized by a much slower reaction rate and a low conversion of aldehyde to nitroethene, with large quantities of starting aldehyde remaining unreacted in the mixture of reaction products.

Known processes for the more difficultly accomplished condensation of polycarbon nitro paraffins and aromatic aldehydes, consist essentially in mixing equimolar quantities of an aromatic aldehyde with the polycarbon non-tertiary nitro paraffin and a basic catalyst, either in the absence of solvent or in the presence of a water-soluble alcohol, and allowing the reaction to proceed, either at room temperature or at the boiling point of the alcohol [Ber. 37, 4507 (1904); J. Am. Chem. Soc. 54, 273 (1932); Chem. Rev. 32, 407, 410 (1943); J. Org. Chem. 12, 501 (1947)]. The time necessary to complete the condensation varies in length up to several weeks, while conversions of the aldehyde to nitroethene, are, except in a few isolated cases where impractically long reaction periods have been employed, less than sixty percent.

However, when the conversion of starting aldehyde is low, e. g., below 60 percent, the product is unsuited for use in further chemical reactions. e. g., reductive hydrolysis, and the considerable quantity of unreacted aldehyde present in the mixture of reaction products must be removed before the product may be thus employed. The unreacted aldehyde must be recovered for economical reasons, and tedious procedures for isolation of the desired nitroethene product are required. This necessary recovery of large quantities of unreacted aldehyde presents technical difficulties and expense, for the aldehyde in many instances may not be separated as its bisulfite addition product, the nitroethene also forming a water-soluble addition product with sodium or potassium bisulfite. While fractional distillation of the reaction mixture has been used for small scale separation of unreacted aldehyde from nitroethene product, this method of purification is undesirably hazardous, especially in large scale operation, as explosions of nitroethenes may occur during distillation. Moreover, procedures requiring a lengthy reaction time, such as more than about eight hours, are uneconomical and impractical for commercial utilization. It is obvious that a more rapid condensation procedure which allows high conversions of starting aldehyde and obviates the previously tedious and hazardous operational difficulties, as well as the necessity of isolating the nitroethene product from the crude mixture of reaction products before use in further chemical processing, would be highly desirable.

It is an object of the present invention to provide a procedure for the condensation of aromatic aldehydes with primary polycarbon nitro paraffins which is more rapid, economical, and practical than previously known methods. Another object of the invention is to provide a method for such condensation which allows high conversions of aldehyde to nitroethene product. An additional object of the invention is to provide a procedure whereby the necessity of recovering unreacted starting aldehyde for economical operation is rendered unnecessary, and wherein the nitroalkene reaction product may be used directly without isolation in further chemical reactions. A further object of this invention is to provide such a condensation procedure which is free of tedious and hazardous operational difficulties. Other objects of the invention will become apparent hereinafter.

The objects of the invention are achieved by conducting the condensation of a primary nitro paraffin with an aromatic aldehyde and promptly removing the water which forms as one product of the reaction from the reaction zone by distillation therefrom or by codistillation therefrom with solvent. This is most conveniently accomplished by conducting the reaction in a water-insoluble solvent at reflux temperature and distilling solvent and water from the reaction zone. The water may then be separated from the solvent and the solvent returned to the reaction zone, or fresh solvent may be added to replace that lost by distillation.

The increased conversion of aldehyde to nitroethene by removal from the reaction zone of water produced by such condensation is entirely unexpected, and the reason for this phenomenon is not presently understood. In those known instances where removal of one reaction product results in the reaction going more nearly to completion, it has been demonstrated that the reactants and reaction products exist in equilibrium and that it is disturbance of the equilibrium which produces this effect. In the case of the condensation between an aldehyde and a nitro paraffin, however, there is no suggestion of reversibility or existence of an equilibrium between the aldehyde and nitro paraffin reactants and the nitroethene and water products. The observed fact that the removal of water formed during the condensation of an aromatic aldehyde and a nitro paraffin will increase the conversion of aldehyde to nitroethene is accordingly not explainable on a basis of present knowledge.

To be suitable for use in the method of this invention, in addition to being water-insoluble, the solvent, when used, should be free of reactive groups, such as the carbonyl group, and should not have such a high boiling point as to cause decomposition of the reactants or reaction product. Suitable solvents are butyl and amyl alcohols and hydrocarbons boiling from 70 to 150 degrees centigrade, such as the heptanes, benzenes, octanes, toluene, or xylene. In a particular embodiment of the invention, a preferred reaction solvent is toluene.

The aromatic aldehyde used contains an aldehyde group attached directly to the phenyl or naphthyl ring. Representative compounds are benzaldehyde, naphthaldehyde, alkyl-substituted benzaldehydes and naphthaldehydes, halogen-, nitro-, amino-, hydroxy- and alkoxy-substituted benzaldehydes and naphthaldehydes, and the like. Specific compounds which may be mentioned are ortho- and meta-alkoxy-(e. g., methoxy, ethoxy, etc.) benzaldehydes, the corresponding anisaldehydes (para-methoxybenzaldehydes), 3,4-dimethoxybenzaldehyde, benzaldehyde itself, para-methylbenzaldehyde, para-isopropylbenzaldehyde, 4-chlorobenzaldehyde, naphthaldehyde, methylnaphthaldehyde, 4 - methoxynaphthaldehyde, and the like. A preferred embodiment of the invention contemplates the use of alkoxy-substituted benzaldehydes as the aromatic aldehyde starting material.

The nitro paraffin employed should be a polycarbon nitro paraffin wherein the nitro group is attached to a carbon atom which is in turn attached to no more than one carbon atom, i. e., the nitro group should be attached to a primary carbon atom. These polycarbon nitro paraffins are referred to as "primary" nitro paraffins herein, as those nitro paraffins having a tertiary structure do not ordinarily undergo condensation and those with a secondary structure do not give the desired nitroethene product. By "polycarbon" is of course intended a nitro paraffin having more than one carbon atom, thus excluding nitromethane, the use of which in condensation with aldehydes is not attended by the difficulties and disadvantages accruing to the use of polycarbon nitro paraffins. The type of polycarbon nitro paraffin which will condense with aldehydes is well defined, and representative primary nitro paraffins useful for the purposes of this invention are thus nitroethane, nitropropane, nitrobutane, nitropentane, 1-nitro-2-methylpropane, and the like, with straight-chain primary nitro paraffins being preferred. The type of nitro paraffin which will undergo condensation with an aldehyde is so well defined in the art that it should be unnecessary to delimit this reactant further than to say that it is a primary nitro paraffin capable of undergoing aldehyde condensation.

The type of catalyst employed in the condensation is also known in the art. This may be any basic catalyst, preferably one which is soluble in the organic reaction solvent, such as primary aliphatic amines. Other catalysts which are recognized in the art as suitable for this type of condensation may also be used.

A satisfactory method of conducting the condensation is to mix approximately equimolar quantities of aromatic aldehyde and polycarbon nitro paraffin in toluene or other selected solvent and to add a soluble basic catalyst such as a primary aliphatic amine, e. g., butyl or amyl amine. The solution may be placed in a suitable reaction container equipped with a condenser and a suitable trap wherein the condensed distillate is collected, water formed during the reaction (and codistilled with the solvent) separated from the condensate, and the solvent returned to the reaction zone. The course of reaction may be followed by observing the quantity of water obtained from the reaction, the reaction being considered complete when no more water is collected. In practice, this usually occurs when nearly the theoretical quantity has been removed from the reaction zone. The length of time required to remove the water may vary between 4 and 20 hours depending upon the solvent, the particular reactants, the quantity of material used, and the rate of distillation. In general, the lower-boiling solvents require a longer period for complete removal of water, but the percentage conversion of the aldehyde to nitroethene is substantially the same irrespective of the solvent used or the time required for complete removal of the water. Conversions of the aldehyde are consistently greater by the method of this invention than when a water-soluble solvent is used or when the reaction is conducted in the absence of a solvent, and the water formed during the reaction is not removed, being generally on the order of 90 percent when the theoretical quantity of water is removed. Moreover, the process is much more rapid and because of the reduced time cycle and high conversion is capable of commercial utilization.

The following examples are illustrative of the present invention but are not to be construed as limiting.

*Example 1.—Prior art procedure*

Sixty-eight grams of ortho-methoxybenzaldehyde and 37.5 grams of nitroethane were added to a solution of 10 milliliters of n-butylamine dissolved in 90 milliliters of absolute ethanol and the entire reaction mixture heated under reflux for six and one-half hours [procedure similar to J. Org. Chem. 12, 501 (1947)]. The solution was then cooled to about five degrees centigrade and allowed to stand overnight at this temperature. The precipitated solid was removed by filtration, washed with cold ethanol, and dried. The quantity of alpha - methyl - beta - (ortho - methoxyphenyl)-nitroethene obtained was 40 grams.

The solvent was removed from the combined filtrates and the residue fractionally distilled. There was obtained 18.4 grams of ortho-methoxybenzaldehyde and 17.1 grams of alpha-methyl - beta - (ortho - methoxyphenyl) - nitroethene distilling at 130–140 degrees centigrade at a pressure of 1.3 millimeters of mercury. The combined quantity of product obtained was 57.1 grams or a conversion of 59 percent, while 18.4 grams or 27 percent of the starting aldehyde was recovered.

Example 2.—Prior art procedure

The condensation was repeated with similar quantities of reactants as in Example 1 using methanol as the solvent. There was isolated from the reaction product a total of 57.6 grams (59.7 percent conversion) of alpha-methyl-beta-(ortho - methoxyphenyl) - nitroethene and 11.1 grams (16 percent) of ortho-methoxybenzaldehyde.

Example 3

Sixty-eight grams of ortho-methoxybenzaldehyde, 37.5 grams of nitroethane, 100 milliliters of benzene and 10 milliliters of n-butylamine were placed in a flask equipped with a reflux condenser and a trap suitable for water separation. The solution was heated to boiling and the amount of water separating observed. After 1.5 hours of refluxing, fifty percent of the calculated quantity of water had collected in the trap; after ten hours, eighty percent; and after 20 hours, one hundred percent. The heating was then discontinued and benzene removed by distillation in vacuo, whereupon the residual light brown oil was fractionally distilled and then refractionated. The forerun, amounting to two percent, distilled above the boiling point of ortho-methoxybenzaldehyde. The main fraction, boiling at 144 degrees centigrade at a pressure of 1.4 millimeters of mercury, weighed 78.7 grams and represented a conversion of 91 percent. Upon crystallization from alcohol or petroleum ether, pure alpha-methyl-beta-(ortho-methoxyphenyl)-nitroethene, melting at 51–52 degrees centigrade, was obtained. The approximate refractive index in the super-cooled molten state was 1.612.

Example 4

Sixty-eight grams of ortho-methoxybenzaldehyde, 37.5 grams of nitroethane, 10 milliliters of butylamine, and 100 milliliters of toluene were mixed and the condensation carried out as in Example 3. One and one-tenth hours were required to remove fifty percent; three and three-fourths hours to remove eighty percent; and five and one-fourth hours to remove one hundred percent of the calculated quantity of water produced by the condensation. The products of the reaction were isolated as in Example 3. There was obtained 63 grams or 80 percent of the theoretical quantity of alpha-methyl-beta-(ortho-methoxyphenyl)-nitroethene.

Example 5

Sixty-eight grams of ortho-methoxybenzaldehyde, 37.5 grams of nitroethane, 10 milliliters of n-butylamine, and 100 milliliters of xylene were mixed and the condensation carried out as in Example 3. Three-fourths hour was required to remove fifty percent; three hours to remove eighty percent; and five hours to remove one hundred percent of the calculated quantity of water produced by the condensation. The reaction products were isolated as in Example 3. There was obtained 73.2 grams or 93 percent of the theoretical quantity of alpha-methyl-beta-(ortho-methoxyphenyl)-nitroethene.

Example 6

In the manner of Example 3, approximately equimolar proportions of benzaldehyde and nitroethane are condensed in toluene in the presence of n-butylamine at about reflux temperature, the distillate collected, water removed, and the toluene returned to the reaction zone. After about six hours, the calculated quantity of water has been removed from the reaction zone and heating is discontinued. The toluene is removed by distillation, whereupon fractionation of the remaining oil gives the desired alpha-methyl-beta, phenylnitroethene in a conversion of nearly 90 percent.

Example 7

In the same manner as given for Example 3, the benzaldehyde and nitropropane are condensed to give alpha-ethyl-beta-phenylnitroethene in a conversion of approximately 80 percent.

Example 8

In the manner of Example 3, naphthaldehyde and nitroethane are condensed to give alpha-methyl-beta-naphthylnitroethane with conversion of starting aldehyde of about 70 percent of theory.

Reference is made to my copending application Serial No. 24,429, filed concurrently herewith, now U. S. Patent 2,557,051 wherein is disclosed certain matter herein described and claimed.

In conclusion, I have found that the step of removing the water produced by the condensation of an aromatic aldehyde and a primary polycarbon nitro paraffin from the reaction zone to be a critical step in that it consistently allows the attainment in a single step of conversions of starting aldehyde as great as fifty percent higher than those previously reported for such condensations, and in that it allows the reaction product to be used directly without isolation in reductive hydrolysis reactions, while such has not been possible with the reaction product of previously reported condensations.

Various modifications may be made in the present invention without departing from the spirit or scope thereof, and it is to be understood as limited only as defined by the appended claims.

I claim:

1. In a process for condensing an aromatic aldehyde selected from the group consisting of benzaldehydes and naphthaldehydes with a primary nitro paraffin having at least two carbon atoms in the presence of a basic condensation catalyst to produce an alpha-alkyl-beta-arylnitroethene, the steps of (1) conducting the condensation in a water-insoluble non-reactive organic solvent, and (2) distilling solvent and water produced by the condensation from the reaction zone substantially as rapidly as formed.

2. In a process for condensing an aromatic aldehyde selected from the group consisting of benzaldehydes and naphthaldehydes with a primary nitro paraffin having at least two carbon atoms in the presence of a basic condensation catalyst to produce an alpha-alkyl-beta-arylnitroethene, the steps of (1) conducting the condensation in a water-insoluble non-reactive organic solvent, (2) distilling solvent and water produced by the condensation from the reaction zone substantially as rapidly as formed, and (3) replacing solvent distilled from the reaction zone.

3. In a process for condensing an aromatic aldehyde selected from the group consisting of benzaldehydes and naphthaldehydes with a primary nitro paraffin having at least two carbon atoms to produce an alpha-alkyl-beta-arylnitroethene, the steps of (1) conducting the condensation in a water-insoluble non-reactive solvent, in the presence of a primary aliphatic amine, at about reflux temperature, (2) distilling solvent and water produced by the condensation from the reaction mixture substantially as rapidly as formed, (3) collecting the distillate, (4) separating water produced by the condensation from the collected distillate, and (5) returning the solvent to the reaction zone.

4. In a process for condensing ortho-methoxybenzaldehyde with nitroethane to produce alpha-methyl - beta - (ortho - methoxyphenyl) - nitroethene, the steps of (1) conducting the condensation in a hydrocarbon solvent boiling between 70 and 150 degrees centigrade, in the presence of a primary aliphatic amine, at about reflux temperature, (2) continuously distilling solvent and water produced by the condensation from the reaction mixture, (3) collecting the distillate, (4) separating the water produced by the condensation from the distillate, and (5) returning the solvent to the reaction zone.

5. In a process for the preparation of alpha-methyl - beta - (ortho-methoxyphenyl) -nitroethene from ortho-methoxybenzaldehyde and nitroethane the steps of (1) condensing the ortho-methoxybenaldehyde and nitroethane in toluene in the presence of n-butylamine at about reflux temperature, (2) continuously distilling toluene from the reaction zone together with water produced by the condensation, (3) separating the water produced by the condensation from the toluene, and (4) returning the toluene to the reaction zone.

RICHARD V. HEINZELMANN.

REFERENCES CITED

The following references are of record in the file of this patent:

UNITED STATES PATENTS

| Number | Name | Date |
|---|---|---|
| 2,415,046 | Senkus | Jan. 28, 1947 |

OTHER REFERENCES

Baker: J. A. C. S., 65, 1572–9 (1943).

Hoover et al.: J. Org. Chem., 12, 501–5 (1947).